United States Patent [19]

Lorch

[11] Patent Number: 4,733,688
[45] Date of Patent: Mar. 29, 1988

[54] MIXER VALVE
[75] Inventor: Werner Lorch, Schramberg, Fed. Rep. of Germany
[73] Assignee: Hans Grohe GmbH & Co. KG, Fed. Rep. of Germany
[21] Appl. No.: 733,518
[22] Filed: May 13, 1985
[30] Foreign Application Priority Data
May 23, 1984 [DE] Fed. Rep. of Germany ....... 3419209
[51] Int. Cl.$^4$ .............................................. F16K 11/06
[52] U.S. Cl. .......................... 137/454.6; 137/625.17; 137/625.4; 251/288
[58] Field of Search ............ 137/454.2, 454.6, 625.17, 137/625.4, 625.41, 636.2, 636.3; 251/288, 285

[56] References Cited
U.S. PATENT DOCUMENTS

| | | | |
|---|---|---|---|
| 3,533,444 | 10/1970 | Lyon | 137/625.17 |
| 3,695,936 | 6/1976 | Lyon | 137/625.17 |
| 3,736,959 | 6/1973 | Parkison | 137/625.17 |
| 3,854,493 | 12/1974 | Farrell | 137/454.6 |
| 3,882,897 | 5/1975 | Manoogian et al. | 137/636.3 |
| 4,088,153 | 5/1978 | Paasikivi | 137/625.4 |
| 4,325,403 | 4/1982 | Uhlmann | 137/454.6 |
| 4,375,824 | 3/1983 | von Borries et al. | 137/625.4 |
| 4,387,880 | 6/1983 | Saarisalo et al. | 251/285 |
| 4,502,507 | 3/1985 | Hayman | 137/625.17 |

FOREIGN PATENT DOCUMENTS

| | | | |
|---|---|---|---|
| 3000631 | 7/1981 | Fed. Rep. of Germany | 137/625.41 |
| 3202040 | 9/1982 | Fed. Rep. of Germany | . |
| 3211619 | 10/1983 | Fed. Rep. of Germany | . |

Primary Examiner—Alan Cohan
Assistant Examiner—John Rivell
Attorney, Agent, or Firm—Steele, Gould & Fried

[57] ABSTRACT

A mixer valve has a valve cartridge arranged in interchangeable manner in a valve casing. A fixed control disk and a movable control disk can be moved counter to one another by an operating element in said valve cartridge. The latter has a roughly tubular casing, which is closed on the outside by a cup-shaped sleeve and on the inside by a cartridge bottom. As a result of this construction, the cartridge can be replaced particularly easily.

22 Claims, 7 Drawing Figures

MIXER VALVE

BACKGROUND OF THE INVENTION

The present invention relates to a mixer valve with a valve cartridge interchangeably mounted in a valve casing and in which are held a fixed control disk and a movable control disk, an operating element and a transmitting element converting the movement of the operating element into a movement of the movable control disk, the operating element projecting out of the cartridge and its pivotability and/or rotatability is limited by stops in order to limit the maximum opening and/or the maximum temperature.

A similar mixer valve for sanitary one lever mixing batteries is already known (DE-OS No. 32 02 040). In the case of the known mixer valve the cartridge is termed a valve cartridge. In the case of said valve, an adjustable stop ring makes it possible to limit both the maximum open position and the maximum temperature position. The stop ring can be modified by the user. The valve cartridge has a relatively complicated construction and requires a certain effort to insert it in the casing or remove it therefrom.

SUMMARY OF THE INVENTION

The problem of the present invention is to construct a mixer valve, particularly a sanitary one lever mixer valve in such a way that it can be universally used and that the interchanging of the valve cartridge can be carried out particularly easily.

According to the invention this problem is solved in that the cartridge has an approximately tubular casing, which is terminated on the outside i.e. the side remote from the valve casing by a cup-shaped sleeve, and on the opposite side, i.e. that directed towards the inside of the valve casing by a cartridge base, the cup-shaped sleeve being radially and axially fixable in the casing by a cap nut. As a result of this relatively simple external design of the cartridge casing, a particularly rapid and simple replacement of the valve cartridge is possible. In the case of the aforementioned, known valve casing, the interchanging of the valve cartridge is much more complicated.

The invention also proposes that the cartridge base has parallel inlet and outlet ports, which can be connected, as desired, with bores in the valve casing. Thus, by means of a given cartridge base it is possible to supply several valve casings, because of the several inlet or outlet ports which can be arranged in the cartridges only those are put into use which have a corresponding continuation in the bottom of the valve casing. Thus, in a specific valve casing, a valve cartridge can fulfil a different function or have a different characteristic as compared with some other valve casing, which considerably simplifies the storage and manufacturing costs.

If the mixer valve characteristics are to be modified in a specific valve casing with given feed bores, according to a further development of the invention the plugs can be inserted in the cartridge base openings, so that specific openings can be rendered inoperative, as required.

According to a further development, by means of snap or locking connections, the cartridge base can be connected in a radially fixed, but axially limitedly movable manner with the cartridge casing. This makes it possible to have a certain clearance or to compensate different manufacturing tolerances whilst it also permits the cartridge base to be easily manufactured. The fitting of the cartridge base can take place from the cartridge base side of the casing, which was not possible in the prior art.

According to a further development, all the openings in the cartridge base are sealed both towards the control disk and towards the valve casing and with respect to one another. The seals or gaskets provided can be part of the cartridge base or can be fixed thereto, so that even in the case of diffferent valve casings, the requirements on the seals are always the same.

The invention proposes that the cartridge casing has a partition into which is shaped a lower part of a bearing for the operating element, preferably for a bearing ball of a shaft of the operating element. This also reduces the number of components and consequently the costs and fault possibilities of the mixer valve.

For a particularly good and reliable guidance of the removable control disk, which, by its relative movement with respect to the fixed control disk determines the mixing ratio and the quantity of the outflowing water, according to the invention a cylindrical guide ring is shaped on to the cartridge casing partition and engages in an elongated recess of the transmitting element, which is rotatable about the cylindrical guide ring and is displaceable up to the same. This ensures that the contacting surface between the two control disks which is preferably flat, is always maintained.

It is particularly favourable if the cup-shaped sleeve is made from metal. This gives a stable mounting for an upper part of a bearing for the operating element. This particularly is favourable if the operating element has a bearing ball, whose bearing is appropriately formed from two parts, at the separating point of which is preferably provided a packing or seal.

According to a further development, the bottom of the cup-shaped sleeve has a recess, through which passes the operating element which forms the stop face, which cooperates with the stop faces on the operating element. It is admittedly also possible to arrange the stop faces on other parts of the casing and/or the moving parts, but the stop faces can be particularly favourably located in the vicinity of the cup-shaped sleeve. In conjunction with a metal sleeve, this in particular leads to very stable stops and increased operating forces do not have to be passed through further transmitting elements. This leads to an almost nonwearing construction. If the dome is made from plastic, which is also possible, it is preferably in one piece with the bearing member.

It is particularly favourable if the fastening element used for fixing the handle has both stop faces for limiting rotation and stop faces for limiting pivoting. The rotation-limiting stop faces preferably have a parallel alignment, whereas the pivoting-limiting stop faces preferably have a conical configuration, so that on contact with the casing stop faces, there is a large-area engagement.

The stop faces are advantageously lined with plastic. The plastic lining of the stop faces can be in one piece with the other part of the operating element bearing.

The invention also proposes in the case of a mixer valve particularly according to one of the preceding claims, to construct the stop faces in such a way that they only limit the valve movement in the maximum temperature position when the valve is completely opened.

In the case of the aforementioned known mixer valve, the temperature limitation is independent of the opening position of the valve. This also applies to a further known one lever mixer valve (DE-OS No. 25 15 990), in which a stop ring with stop faces limits the rotation of a guide part determining a temperature change to the outflowing mixing water. Thus, the stop ring is merely set at the time of fitting the mixer valve, as a function of the pressure at the installation point, as well as the hot water temperature prevailing there.

A one handle water mixing tap is also known (DE-AS No. 25 21 911), in which the control handle can only be moved from the closed position into the hot position through passing before hand through a position supplying cold water alone and in large quantities. The maximum temperature position is modified by an adjustable stop, so that once again the maximum temperature can be set.

In these two known mixer valves, admittedly a given water temperature cannot be exceeded once an expertly carried out installation has taken place, but this only applies if there is no change to the water pressure and hot water temperature. If, for example, the hot water temperature in the supply system drops compared with the temperature at the sole adjustment, or if the hot water pressure falls, it is no longer possible to set to the maximum possible hot water temperature, because the maximum temperature position cannot be reached.

Unlike in the case of the known temperature limiting means, the invention provides a mixer valve which provides protection against excessively hot temperatures, but which also makes it possible to utilize the maximum available hot water temperature, whilst preventing unintentional scalding. In connection with one lever mixer valves, it has been found that the user regularly initially completely opens the valve and only then sets the temperature. However, as a result of the stop, it cannot set the maximum temperature with the valve fully open. This ensures the protection against scalding. However, if in certain cases the user wishes to utilize the maximum temperature, he only needs to shut off the valve, so that then the stop no longer acts. Through contacting the stop, the operator is provided with a signal making him aware of the possibility that he has now reached a range where it is necessary to modify the quantity setting, if he wishes to obtain maximum hot water.

The invention proposes that the stop is arranged and constructed in such a way that in the maximum open position it prevents the maximum temperature setting and in the maximum temperature setting prevents the maximum open position.

The invention also proposes that the mixer valve has a second stop, which limits the movement of the valve into the completely open position and only limits this movement in the maximum hot position. The two stops can also be constructed as a single stop. As a result of the possibility of limiting the open position at maximum temperature, a certain protection is also provided, because then the hot water quantity is reduced.

It is particularly advantageous if the stop is formed by a step, shoulder, etc. in a guide face of the valve or valve casing. On the latter, e.g. a guide element can engage on the control element, the guide face generally being provided in any case for limiting the movement of the control element.

According to a further development, it is possible to overcome at least one stop against spring tension. For example, one stop can be under spring tension, so that it can be forced or moved back when subject to the action of a control element or a part connected thereto. In this case, the spring preloading can serve to achieve a fixing of the valve in the maximum open position at maximum temperature and, in order to bring the valve into this position, the user must deliberately overcome the resistance of the spring tension beforehand and possibly also the resistance of the second stop.

It is also possible, as proposed by the invention, to overcome the stop by modifying the quantity position and/or by modifying the temperature setting of the handle. Here again reliable protection is provided against unintentional incorrect operation, whereas the user can deliberately bring the valve into a position, in which he can set the maximum temperature at the maximum open position.

It is also possible for at least one stop to be formed by a rib or the like. In this case, in order to overcome the stop, the valve must be slightly closed, but can be completely opened again after overcoming the stop in the form of a rib. Here again, it is only possible to deliberately set the maximum temperature at the maximum open position, an unintentional setting being prevented.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
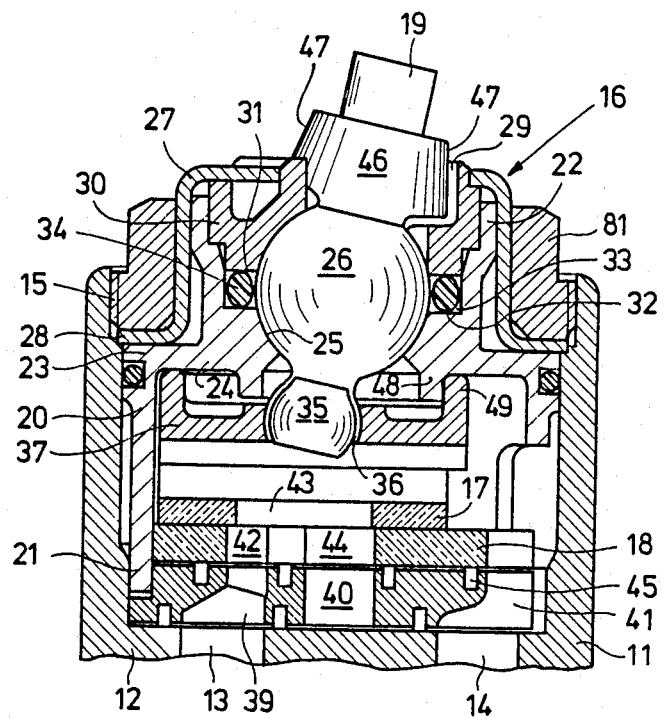
FIG. 1 a longitudinal section through a mixer valve according to the invention.

The mixer valve diagrammatically shown in FIG. 1 has a mixer casing 11 shown in broken away form, which has a recess which is roughly cylindrical and open at the top in FIG. 1, being bounded by a casing base 12. The latter has a plurality of water inlet bores 13, whereof only one is visible in FIG. 1, as well as a water outlet bore 14. The cylindrical recess of mixer casing 11 is provided in the vicinity of its outer edge with an internal thread 15. A valve cartridge 16 is inserted from above into the cylindrical recess and contains the control disks 17, 18 for carrying out the mixing, and also the operating element 19.

Cartridge 16 has an approximately tubular cartridge casing 20 which, in the lower area facing the casing base 12 of mixer casing 11, has a larger diameter, whilst in the upper, opposite area has a smaller diameter. The larger diameter area 21 is separated from the smaller diameter area 22 by a flange 23, which continues inwards in a partition 24. The latter has a central opening, whose edge 25 is in the form of the surface of a ball coating. The radius of this ball coating roughly corresponds to the radius of a bearing ball 26 of operating element 19. Above the edge 25 of the opening in partition 24, the internal diameter of the cartridge casing area 22 increases, a cupshaped sleeve 27 being placed from above on casing 20 and its outwardly directed, all-round edge 28 rests on flange 23 of area 21 of cartridge casing 20. On the inside of the cup-shaped sleeve 27, which is provided with an opening 29, is located a bearing member 30, with a downwardly directed lug, which engages flush in area 22 of cartridge casing 20, its lower edge 31 leaving a spacing with respect to the shoulder 32 of casing area 22. As a result of this spacing, a groove 33 is formed which passes round the bearing ball 26 and in which is inserted a gasket 34. The inside of the lug on bearing member 30 is once again partly shaped like a ball surface, which corresponds to the surface of bearing ball 26. Thus, in the assembled state, partition 24 and lug 30 on the inside of the cup-shaped sleeve 27 forms a bearing for bearing ball 26, with the aid of which it is possible to pivot and rotate operating element 19.

Figure 2:
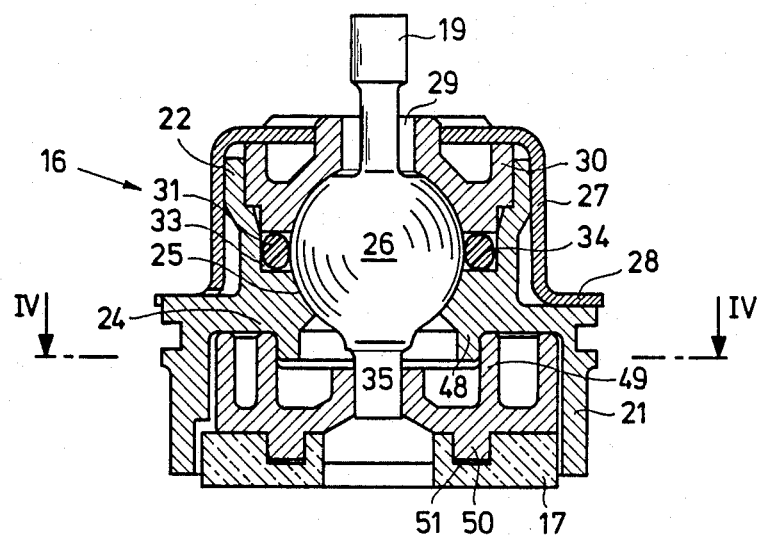
FIG. 2 a longitudinal section in a plane displaced by 90° relative to FIG. 1.

On its side directed towards the interior of the mixer valve, operating element 19 has a lug 35 on the other side of the bearing ball, which in FIG. 1 has an approximately circular limitation, but from a direction at right angles thereto has a rectangular limitation, of FIG. 2. This lug 35 engages in a complementary opening 36 in a motion transmitting element 37 forming the connection between operating element 19 and the movable control disk 17. A pivoting of operating element 19 about bearing ball 26 leads to a displacement of the motion transmitting element 37 and consequently the control disk 17, whilst a rotation of operating element 19 about its longitudinal axis leads to a rotation of the motion transmitting element 37 and consequently the control disk 17 about a perpendicular axis on the contact plane between the movable and fixed control disk.

The bottom of the cartridge casing 20 is closed by a cartridge base 38, which has a plurality of openings, whereof FIG. 1 only shows a single opening 39 corresponding with the inlet port 13 of casing base 12, and a further opening 40, which does not correspond to the opening in casing base 12. To the right in FIG. 1, cartridge base 38 also has a recess 41, which is positioned above the water outlet port 14 of casing base 20. In the embodiment according to FIG. 1, water can pass through the openings 13 of the casing base and opening 39 in the cartridge base, to an opening 42 of the fixed control disk 18 and from there through the central opening 43 of the movable control disk 17 into the space above the latter and from there laterally past the control disks through recess 41 and into water outlet 14. As the opening 40 in the cartridge base does not have a corresponding opening in casing base 12, the cartridge base opening 40 and the corresponding fixed control disk opening 44 are shut, but the cartridge could be used in some other valve casing, in which opening 40 would correspond to an opening in the casing base.

Around the openings 39, 40 in cartridge base 38 and on the top and bottom surfaces of the latter are provided seals 45, which bring about a sealing of the connection of the water flow.

Above the bearing ball 26, operating element 19 has a widened area 46, which contains two facing stop faces 47, which converge in the direction out of the casing.

A cylindrical ring 48 is shaped in one piece on to the bottom of the partition 24 of cartridge case 20, and on it engages at least partly an allround annular rib 49 of the motion transmitting element 37.

FIG. 2 shows a section through cartridge 16 without the fixed control disk and cartridge base 38. It is possible to clearly see the hemispherical bearing member for the bearing ball 26 of operating element 19, which is formed by the lug 30 on the inside of the cup-shaped sleeve 27 and the partition 24 of the cartridge casing 20. It is also possible to see the engagement of annular rib 49 of the motion transmitting element 37 of the guide ring 48 on the bottom of partition 24. As a result of this engagement of annular rib 49 on guide ring 48 a reliable guidance of the motion transmitting element 37 is ensured. The latter is provided on its bottom with two elongated ribs 50, which engage in corresponding grooves 51 in the movable control disk 17, thus a rotation and displacement of the motion transmitting element leads to an identical movement of the movable control disk.

Figure 4:
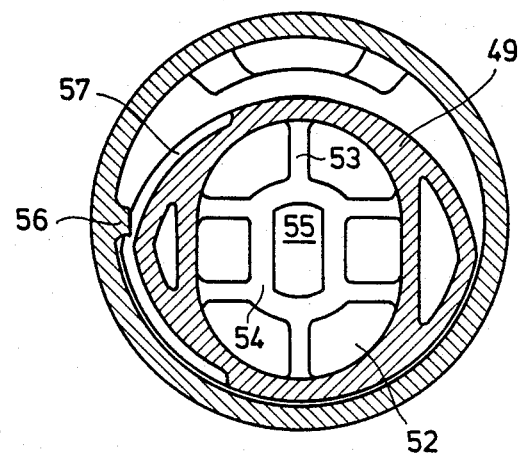
FIG. 4 a section through the arrangement of FIG. 2 roughly along line IV—IV.

FIG. 4 discloses the form or shape of the motion transmitting element. In particular it is possible to see the shape of annular rib 49 and which encloses in its interior an oval recess 52 bounded by two circle halves. A central portion 54 is connected to annular rib 49 by webs 53 and contains an opening 55 for receiving lug 35 of operating element 19.

A lug 56 on the inside of the cartridge casing 56, together with a setting back of the outer edge 57 of the motion transmitting element 37 ensures the correct insertion of said element.

Figure 3:
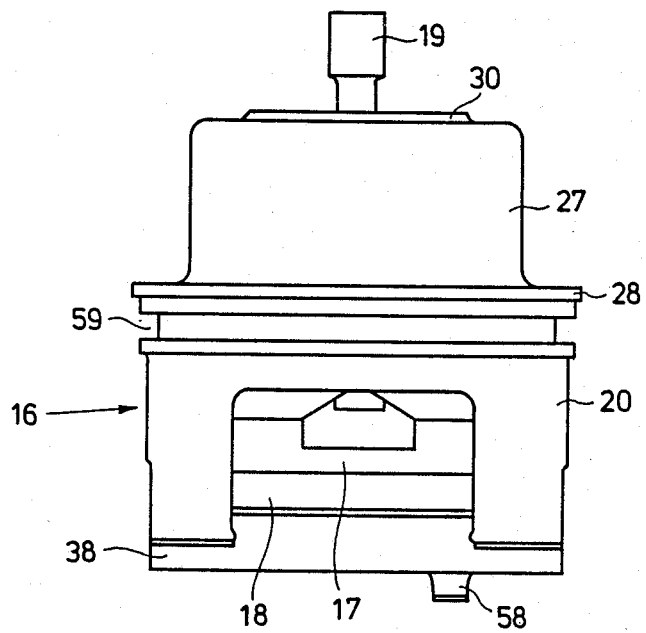
FIG. 3 a side view of the valve cartridge used in FIG. 1.

FIG. 3 is a side view of cartridge 16 with cartridge casing 20, cup-shaped sleeve 27 and cartridge base 38, which is provided on its bottom with a centering lug 58, with the aid of which it is possible to centre cartridge 16 relative to a valve casing 11. A snap connection connects cartridge base 58 to cartridge casing 20. A plastic shoulder 30 projects upwards somewhat from the top of the cup-shaped sleeve 27 which forms part of the bearing for bearing ball 26.

FIG. 3 also shows an all-round groove 59 positioned below the edge 38 of the cup-shaped sleeve 27 for receiving a ring seal for sealing the cartridge against mixer casing 11.

Figure 5:
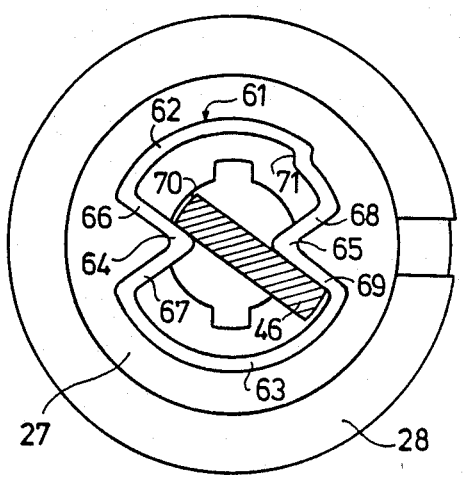
FIG. 5 a plan view of the valve cartridge of FIG. 3.

FIG. 5 is a plan view of cartridge 16 in FIG. 3, the widened area 46 of the operating element being shown in section. The upper part of lug 30 of the cup-shaped sleeve 27 together with the surfaces of the widened area 46 forms a stop, which limits both the rotary movement and the pivoting movement of operating element 19. Lug 30 forms a guide edge 61, whose slope corresponds to that of the end faces 47 of operating element 19. Both in the completely closed and completely open position of the valve, in each case one end face 47 of area 46 engages on the inside of guide edge 61.

FIG. 5 diagrammatically shows a plan view of guide edge 61, as well as the position of the cross-sectionally elongated area 46. Operating element 19 is turned as far to the left as is permitted by guide edge 61, which is formed by two approximately circular portions 62, 63, between which are arranged two inwardly directed projections 64, 65, each of which is formed by two, roughly radially directed legs 66, 67 or 68, 69. In the position shown in FIG. 5, which corresponds to the minimum temperature, the left-hand side of the area 46 engages on the inside of legs 66 and the right-hand side on the inside of the opposite leg 69, so that a further rotation to the left is prevented. In order to open the valve from this position, the control element 19 must be pivoted in such a way that area 46 is moved to the left and upwards in the direction of its longitudinal axis, until its end face 47 engages on the inside of portion 62 of guide edge 61. In this position, the valve is completely open in the case of cold temperature. If the valve is turned towards a hotter temperature in this position, which is not shown in the drawing, edge 70 of area 46 in the range of the end face limiting the maximum open position abuts against a step 71 on the inside of portion 62 of guide edge 61. This prevents further turning in the direction of a higher temperature. A further turning or rotation can only take place if the valve is deliberately closed again to a certain extent from the maximum open position, so that then the end face can be moved further on the inside of guide edge 61 until the right-hand side of area 46 engages on the inside of leg 68.

Through the arrangement of step 71 on the inside of guide edge 61, it is ensured that the maximum temperature can only be reached in the case of a reduced open position.

Figure 6:
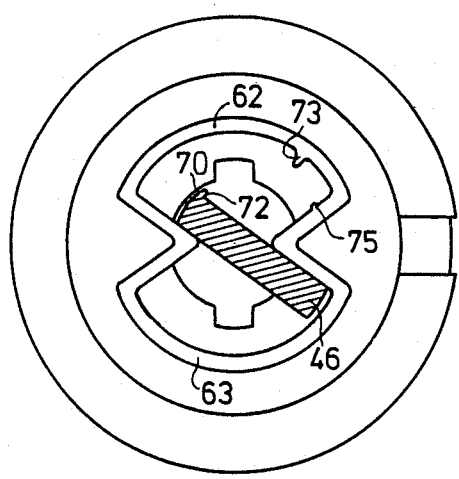
FIG. 6 a plan view corresponding to FIG. 5 of a modified embodiment.

In the case of FIG. 6, edge 70 of area 46 has in the vicinity of the end face limiting the maximum opening a lug 72, whilst portion 62 of guide edge 61 has, at the point in FIG. 5 where step 71 is present, a lug or rib 73. In addition, the inside of leg 68 has a rib 75 similar to rib 73.

If, in the case of the embodiment of FIG. 6, area 46 is moved out of the maximum open position into the maximum temperature position, then lug 72 abuts against rib 73, so that an unintentional maximum temperature setting is prevented. Rib 73 can only be overcome by slightly restricting the valve, i.e. by once again moving end face 47 of area 46 away from portion 62 of guide edge 61. If the maximum temperature is set at this reduced open position, the valve can again be completely open, because the distance between rib 73 and the inside of leg 68 is somewhat larger than the width of area 46. Thus, it is possible here to deliberately set the maximum temperature in the case of maximum opening.

However, if the valve is moved from the closed position into the open position with the maximum temperature setting, lug 72 engages on rib 75 on the inside of leg 68, so that once again a stop is obtained. The latter can be overcome by reducing the temperature setting, i.e. a slight counterclockwise rotation. Thus, a second stop is formed which prevents the unintentional full opening at maximum temperature from another direction.

As can be gathered from the left of FIG. 2, sleeve 27 is radially aligned with respect to the cartridge casing and is fixed by engagement in a slot or the like.

Figure 7:
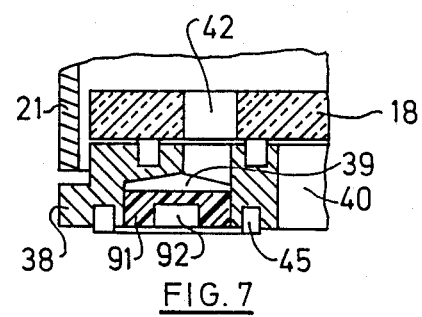
FIG. 7 a part section similar to FIG. 1 through a further embodiment.

The embodiment of FIG. 7 differs from that of FIG. 1 in that the cartridge bottom 38 is somewhat thicker. Opening 39, which issues at the bottom in FIG. 7 is closed by a plug 91, for example with a recess 92. Plug 91 can be made from plastic. Thus, opening 39 is rendered inoperative, so that as a result the characteristics of the mixer can be changed with the valve casing remaining the same. Naturally it is also possible to e.g. close opening 40 with a plug. The plug can be removed again when it is no longer needed.

What is claimed is:

1. A mixer valve comprising a valve casing having bores, a valve cartridge interchangeably mounted in said valve casing, a fixed control disk and a movable control disk for mixing fluids, mounted on said valve cartridge in operative association with an operating element having stop faces and a bearing ball and a transmitting element for converting the movement of said operating element into a movement of the movable control disk, said operating element projecting out of the cartridge and having its mobility limited by said stop faces for limiting the maximum possible temperature, said cartridge having a substantially tubular casing which is closed on the outside by a cup-shaped sleeve and on the inside by a removably mounted cartridge base, a cap nut radially fixing said sleeve in the valve casing and a partition fixed in said cartridge in which is shaped a lower part of a bearing for said bearing ball.

2. A mixer valve according to claim 1, wherein said cartridge base has parallel inlet ports and outlet ports which are linked with bores in the valve casing.

3. A mixer valve according to claim 2, wherein the cartridge base has recesses, said recesses being linked with bores of said valve casing.

4. A mixer valve according to claim 2, wherein said cartridge base is provided with openings having detachable plugs.

5. A mixer valve according to claim 1, wherein the cartridge base is connected to the cartridge case in a radially fixed, and axially limited manner by means of snap connections.

6. A mixer valve according to claim 2, wherein all the ports in the cartridge base are sealed towards the control disk, towards the valve casing and relative to one another.

7. A mixer valve according to claim 1, wherein said transmitting element has an elongated recess and a cylindrical guide ring is shaped onto the partition of the cartridge casing and engaging in said elongated recess, said transmitting element being rotatable about the cylindrical guide ring and displaceable relative thereto.

8. A mixer valve according to claim 1, wherein the cup-shaped sleeve is metal.

9. A mixer valve according to claim 1, wherein the cup-shaped sleeve forms mounting for an upper part of a bearing for the operating element.

10. A mixer valve according to claim 1, wherein the bottom of the cup-shaped sleeve has a recess, through which passes the operating element which forms the stop face.

11. A mixer valve according to claim 1, wherein the operating element has stop faces for rotation limitation and stop faces for pivoting limitation.

12. A mixer valve according to claim 11, wherein the stop faces are lined with plastic.

13. A mixer valve according to claim 12, wherein the plastic lining of the stop faces is in one piece with the upper part of the bearing for the operating element.

14. In a mixer valve wherein an operating element sets a flow rate of outflowing water and sets a mixing ratio between hot and cold water, and wherein a mixer casing has a stop for limiting the movement of the valve into a maximum temperature position so as to prevent unintentional scalding, the improvement which comprises stop faces limiting the movement of the valve into the maximum temperature position only when the valve is placed in a fully opened position, said stop faces allowing movement into the maximum temperature position so long as the valve is out of the fully opened position.

15. A mixer valve according to claim 14, wherein said stop faces prevent the valve from moving into the maximum temperature position only when the valve is placed in the fully opened position, and said stop faces prevent the valve from moving into the fully opened position only when the valve is placed at the maximum temperature position.

16. A mixer valve according to claim 15, further comprising a stop limiting the movement of the valve into the maximum opening position only in the maximum hot position.

17. A mixer valve according to claim 14, wherein the stop faces are provided with a step.

18. A mixer valve according to claim 14, wherein at least one stop face has a rib.

19. A mixer valve according to claim 14, wherein the stop faces are overcome by modifying the quantity setting of the operating element.

20. A mixer valve according to claim 14, wherein the stop faces are overcome by modifying the temperature setting of the operating element.

21. A mixer valve comprising
a valve casing having a plurality of bores,
an integral and partitioned valve cartridge interchangeably mounted in said valve casing, said valve cartridge having a substantially tubular casing which is closed on the outside by a cup-shaped sleeve and on the inside by a removably mounted cartridge base, said cartridge base having a plurality of bores which are adapted for connection with bores of said valve casing,
a fixed control disk and a movable control disk mounted in said valve cartridge in operative association with an operating element having stop faces for limiting the movement of said mixer valve in the maximum temperature position when said mixer valve is completely open,
a transmitting element for converting the movement of said operating element into movement of said movable control disk, and
a cap nut radially fixing said sleeve in said valve casing.

22. The mixer valve according to claim 21 including a cylindrical guide ring shaped onto a partition of the valve casing and engaging said transmitting element, said transmitting element being rotatable about said guide ring and displaceable relative thereto.

* * * * *